US 7,743,111 B2

(12) United States Patent
Soltis

(10) Patent No.: US 7,743,111 B2
(45) Date of Patent: *Jun. 22, 2010

(54) SHARED FILE SYSTEM

(75) Inventor: Steven Soltis, Rochester, MN (US)

(73) Assignee: Data Plow, Inc., Rochester, MN (US)

( * ) Notice: Subject to any disclaimer, the term of this patent is extended or adjusted under 35 U.S.C. 154(b) by 1499 days.

This patent is subject to a terminal disclaimer.

(21) Appl. No.: 10/738,371

(22) Filed: Dec. 16, 2003

(65) Prior Publication Data

US 2004/0133570 A1 Jul. 8, 2004

Related U.S. Application Data

(63) Continuation of application No. 09/045,340, filed on Mar. 20, 1998, now Pat. No. 6,697,846.

(51) Int. Cl.
*G06F 15/16* (2006.01)
*G06F 17/30* (2006.01)

(52) U.S. Cl. .................. 709/217; 709/202; 709/245; 707/10

(58) Field of Classification Search ................. 709/203, 709/213, 214, 215, 217, 219, 245; 711/147; 707/1, 10, 203
See application file for complete search history.

(56) References Cited

U.S. PATENT DOCUMENTS

| 5,043,876 | A | 8/1991 | Terry |
| 5,202,971 | A | 4/1993 | Henson et al. |
| 5,561,799 | A | 10/1996 | Khalidi et al. |
| 5,652,913 | A | 7/1997 | Crick et al. |
| 5,668,958 | A | 9/1997 | Bendert et al. |
| 5,740,230 | A | 4/1998 | Vaudreuil |
| 5,758,342 | A | 5/1998 | Gregerson |
| 5,764,972 | A | 6/1998 | Crouse et al. |

(Continued)

OTHER PUBLICATIONS

T. Anderson, M. Dahlin, J. Neefe, D. Patterson, D. Roselli, and R. Wang, "Serverless Network File System," Proceedings of the Fifteenth ACM Symposium on Operating System Principles, 1995, The Association for Computer Machinery (ACM) Press, New York, NY USA.

(Continued)

*Primary Examiner*—Paul H Kang
(74) *Attorney, Agent, or Firm*—Beck & Tysver, P.L.L.C.

(57) ABSTRACT

A shared storage distributed file system is presented that provides users and applications with transparent access to shared data stored on network attached storage devices by utilizing layering techniques to inherit file management functionality from existing file systems. The present invention stores meta-data for the shared data as real-data in a standard, non-modified, client-server distributed file system, such as NFS. In effect, the standard client-server file system acts as a meta-data server. The name space consisting of inode files stored as real-data on the meta-data server acts as the name space for the shared data. Similarly, file attributes of the inode files are utilized as the file attributes of the shared data. By utilizing an existing client-server system as the meta-data server, development time and complexity are greatly reduced, while speed advances in the underlying client-server system may be incorporated without alteration of the present invention. A method for communicating with network attached storage devices over layered file systems is also presented.

56 Claims, 12 Drawing Sheets

U.S. PATENT DOCUMENTS

| | | | |
|---|---|---|---|
| 5,802,366 | A | 9/1998 | Row et al. |
| 5,828,876 | A | 10/1998 | Fish et al. |
| 5,832,501 | A * | 11/1998 | Kain et al. ............. 707/103 R |
| 5,909,540 | A | 6/1999 | Carter et al. |
| 5,931,918 | A | 8/1999 | Row et al. |
| 5,933,603 | A | 8/1999 | Vahalia et al. |
| 5,978,773 | A | 11/1999 | Hudetz et al. |
| 5,987,621 | A | 11/1999 | Duso et al. |
| 6,289,356 | B1 | 9/2001 | Hitz et al. |
| 6,442,682 | B1 | 8/2002 | Pothapragada et al. |
| 2001/0037406 | A1 | 11/2001 | Philbrick et al. |
| 2002/0112022 | A1 | 8/2002 | Kazar et al. |

OTHER PUBLICATIONS

M. Devarakonda, A. Mohindra, J. Simoneaux, and W. Tetzlaff, "Evaluation of Design Alternatives for a Cluster File System," 1995 USENIX Technical Conference on UNIX and Advanced Computing Systems, Jan. 1995, pp. 35-46, USENIX Association, Berkeley, CA USA.

G. Gibson, D. Nagle, K. Amiri, F. Chang, H. Gobioff, E. Riedel, D. Rochberg, and J. Zelenka, "File Server Scaling with Network-Attached Secure Disks," Proceedings of the ACM International Conference on Measurements and Modeling of Computer Systems, Jun. 1997, The Association for Computer Machinery (ACM) Press, New York, NY USA.

G. Gibson, D. Nagle, K. Amiri, F. Chang, E. Feinberg, H. Gobioff, C. Lee, B. Ozceri, E. Riedel, D. Rochberg, and J. Zelenka, "Filesystems for Network-Attached Secure Disks," Carnegie Mellon University Technical Report CMU-CS-97-118, Jul. 1997, Carnegie Mellon University, Pittsburgh, PA USA.

J. Heidemann and G. Popek, "File System Development with Stackable Layers," ACM Transaction on Computer Systems, 1994, pp. 58-89, The Association for Computer Machinery (ACM) Press, New York, NY USA.

Y. Khalidi and M. Nelson, "Extensible File Systems in Spring", Sun Microsystems Laboratories Technical Report TR-93-18, Sep. 1993, Sun Microsystems Laboratories, Inc., Mountain View, CA USA.

S. Kleiman, "Vnodes: An Architecture for Multiple File System Types in Sun UNIX," Proceedings of the Summer USENIX Conference, Jun. 1986, pp. 238-247, USENIX Association, Berkeley, CA USA.

K. Matthews, "Implementing a Shared File System on a HIPPI Disk Array," Fourteenth IEEE Symposium on Mass Storage Systems, 1995, pp. 77-88, Institute of Electrical and Electronics Engineers, Inc., Piscataway, NJ USA.

J. Ousterhout, A. Cherenson, F. Douglis, M. Nelson, and B. Welch, The Sprite Network Operating System, IEEE Computer, Feb. 1988, pp. 23-36, Institute of Electrical and Electronics Engineers, Inc., Piscataway, NJ USA.

B. Pawlowski, C. Juszczak, P. Staubach, C. Smith, D. Lebel, and D. Hitz, "NFS Version 3: Design and Implementation," Proceedings of the Summer USENIX Conference, 1994, USENIX Association, Berkeley, CA.

D. Rosenthal, "Evolving the Vnode Interface," Proceedings of the Summer USENIX Conference, Jun. 1990, pp. 107-117, USENIX Association, Berkeley, CA USA.

R. Sandberg, D. Goldberg, S. Kleiman, D. Walsh, and B. Lyon, "Design and Implementation of the Sun Network File System," Proceedings of the Summer USENIX Conference, 1985, pp. 119-130, USENIX Association, Berkeley, CA USA.

M. Satyanarayanan, "Scalable, Secure, and Highly Available Distributed File Access," IEEE Computer, May 1990, pp. 9-20, Institute of Electrical and Electronics Engineers, Inc., Piscataway, NJ USA.

M. Satyanarayanan, "Code: A Highly Available File System for a Distributed Workstation Environment," Proceedings of the Second IEEE Workshop on Workstation Operating Systems, Sep. 1989, Institute of Electrical and Electronics Engineers, Inc., Piscataway, NJ USA.

S. Soltis, The Design and Implementation of a Distributed File System base on Shared Network Storage. PhD Thesis, University of Minnesota, 1997, University of Minnesota, Minneapolis, MN USA.

D. Wiltzius and K. Minuzzo, "Network-attached peripherals (NAP) for HPSS/SIOF," Lawrence Livermore National Laboratory Technical Report, 1995. Available at http://www.llnl.gov/liv_comp/siof/siof_nap.html, Livermore, CA USA.

* cited by examiner

SHARED FILE SYSTEM

This is a continuation application of U.S. patent application Ser. No. 09/045,340 filed Mar. 20, 1998 now U.S. Pat. No. 6,697,846.

FIELD OF THE INVENTION

The present invention relates general to computer file systems. More specifically, the present invention involves a distributed file system based on two technologies: shared storage and file system layering.

BACKGROUND OF THE INVENTION

File Systems

The term "file system" refers to the system designed to provide computer applications with access to data stored on storage devices in a logical, coherent way. File systems generally hide the details of how data is stored on a storage device from the application program. For instance, data on a storage device is generally block accessible, in that data is addressed with the smallest granularity of a block; with multiple blocks forming an extent. The size of the particular block depends upon the actual device involved. Application programs generally request data from file systems byte by byte. Consequently, file systems are responsible for seamlessly mapping between application program memory space and the storage device address space.

Application programs store and retrieve data from files as contiguous, randomly accessible segments of bytes. Users are responsible for organizing data stored in these files, since file systems are generally not concerned with the content of each file. With a byte-addressable address space, users may read and write data at any offset within a file. Users can grow files by writing data to the end of a file. The size of the file increases by the amount of data written. Conversely, users can truncate files by reducing the file size to a particular length.

To maximize storage efficiency, file systems place "holes" in areas within files that contain no data. Holes act as space holders between allocated sections of user data. File systems must manage holes, though no data is allocated to the holes until users write data to the location. When a user reads from a hole, the file system fills the user buffer with zeros.

A hole can either occupy space within an allocated block or occupy space of entire blocks. File systems manage block aligned holes in a manner similar to real-data blocks, yet no blocks are allocated. File systems manage holes internal to allocated blocks simply by zeroing the space of the hole.

In addition, file systems are generally responsible for maintaining a disk cache. Caching is a technique to speed up data requests from application programs by saving frequently accessed data in solid-state memory for quick recall by the file system without having to physically retrieve the data from the storage device. Caching is also useful during file writes; file system may write user data to cache memory and complete the request before the data is actually written disk storage.

Additionally, file systems maintain information indicating which data blocks are available to be allocated to files. File systems modify these free lists during file allocation and de-allocation. Most modern file systems manage free lists by means of bitmap tables. File systems set bits to signify blocks that are allocated to files.

File systems present data to application programs as files-contiguous, randomly accessible segments of bytes. These files, called regular files, are presented to application programs through directory files which form a tree-like hierarchy of files and subdirectories containing more files. The complete directory structure is called the file system name space. Link files are a third type of file used to provide multiple file names per physical file.

File systems are required to map this application level interface to the often non-contiguous data blocks stored on the storage device. Generally, information required to map a particular file or directory to the physical locations of the storage device is stored by the file system in an inode within a data block. Inodes contain information, called attributes, about a particular file, such as file type, ownership information, access permissions and times, and file size. Inodes also contain a list of pointers which address data blocks. These pointers may address single data blocks or address an extent of several consecutive blocks. The addressed data blocks contain either actual data or a list of other pointers. With the information specified by these pointers, the contents of a file can be read or written by an application program. When an application program writes to a file, data blocks may be allocated by the file system. Such allocation modifies the inode.

The terms meta-data and real-data classify file system structure data and user data, respectively. In other words, real-data is data that users store in regular files. Other terms for real-data include user data and file data. File systems create meta-data to store layout information, such as inodes and free block bitmap tables. Meta-data is not directly visible to users. Meta-data requires a fraction of the amount of storage space that real-data occupies and has significant locality of reference. As a result, meta-data caching drastically influences file system performance.

Meta-data consistency is to vital file system integrity. Corruption of meta-data may result in the complete destruction of the file system. Corruption of real-data may have bad consequences to users but will not effect the integrity of the whole file system.

Distributed Files Systems

File systems can generally be divided into two separate types. Local file systems allow computers to access files and data stored on locally attached storage devices. While local files systems have advanced significantly over the years, such file systems have limited usefulness when data needs to be shared between multiple computers. Distributed files systems have been developed in order to make shared data available to multiple computer systems over a computer network. Distributed file systems provide users and applications with transparent access to files and data from any computer connected to the file system. Distributed file system performance cannot equal local file system performance due to resource sharing and lack of data locality.

Traditional distributed file systems are based on client-server architectures. Server computers store shared data on locally attached storage devices, called server-attached devices. Clients send file system requests to server computers via networks. Early distributed file systems, such as Sun Microsystems Network File System (NFS), use a central server to store real and meta-data for the file system. These central servers locally maintain meta-data and transport only real-data to clients. The central server design is simple yet efficient, since all meta-data remains local to the server. Like local file systems, central servers only need to manage meta-data consistency between main memory and storage devices. In fact, central server distributed file systems often use local file systems to manage and store meta-data for the file system. In this regard, the only job of the central server file system is to transport real-data between client and server.

As the need grew for greater parallelism and enhanced availability, distributed file system designs evolved from central servers to multiple server configurations. As with central servers, multiple servers, also known as distributed servers, store all file system data on devices connected to server computers. Since multiple servers cooperatively manage the file system, servers may share meta-data between computers. The complexity of these designs increases an order of magnitude, since distributed system integrity requires strong meta-data consistency between servers. Such systems cannot use local file systems to store data. As a result, server software must manage, store, and transport meta-data between servers. Two examples of distributed server file systems are the Andrew File System from Carnegie Mellon University and the Sprite File System from the University of California at Berkeley.

Distributed server file systems have further evolved into designs where clients and servers are often difficult to distinguish. In these systems, clients manage, store, and transport real-data and meta-data between servers and other clients. Coda from Carnegie Mellon University and the xFS File System from the University of California at Berkeley are two examples of merged client-server designs.

One aspect of client-server file system designs that has remained unchanged among central server, distributed server, and merged client-server designs is the local attachment of storage devices to computers. Unfortunately, this architecture has performance and availability weaknesses. With devices attached to computers, a computer failure renders data stored on the storage device inaccessible. Although redundant devices on separate computers can be added to improve availability, such a technique adds complexity and cost to the system.

Furthermore, the architecture limits performance when clients access data stored on remote devices. The data-path between client and storage device includes a server computer. This server adds overheads caused by server workload and overheads relating to storage device interface to network interface protocol translations. Server computers designed to support large workloads are very expensive.

Shared Storage Distributed Files Systems

Distributed file system designs that use shared storage, or shared disk, technologies have followed a slightly different evolution path.

Instead of storing data on storage devices connected locally to computers, shared storage designs store data on devices shared between client computers. Shared storage systems have a short data-path between clients and devices.

These distributed system require arbitration for the storage devices and consistency management of any data cached on the clients. Consistency mechanisms are either centrally located or distributed within the system. The consistency mechanisms may include software running on computers, hardware mechanisms attached to the networks, or a combination of both.

Two distinct file system designs utilize shared storage technology. The first case uses private file managers, in which client computers independently access meta-data and real-data directly from the storage devices. Private file manager schemes do not require dedicated file servers, since all necessary data is taken directly from the shared storage devices. With private file manager designs, each client views storage as locally attached. Clients only service local file requests. No direct communication is needed between clients. Such systems are often derived from modified local file systems. Examples of such systems include the Cray Research Shared File System, the Digital VAXcluster, and the Global File System from the University of Minnesota.

As a result of their designs, clients utilizing private file manages remain independent from the failures and bottlenecks of other clients. Similarly, client resources such as memory, CPUs, and bus bandwidth are not spent servicing requests from other clients. However, private file manager designs do have several disadvantages. First, the designs can only support a primitive form of caching. Clients may only access data cached locally in memory or stored on the shared devices; data cached in the memory of other clients is not accessible. The second disadvantage deals with complications encountered during recovery. Since clients are not aware of other clients, clients must indirectly determine data corruption caused by other client failures.

The second type of shared storage distributed file system design utilizes file manager server computers. These file servers manage file system directory structures and meta-data on non-shared storage devices. Clients make requests to the servers, the servers determine the location of real-data on shared devices by calling and examining meta-data from the non-shared storage device. Once the location is determined, the servers either initiate transfers between clients and storage devices or inform clients how to invoke the transfer. Servers must maintain and store meta-data, manage real-data, and control transfers between clients and storage devices. These shared storage designs suffer from many of the same difficulties as client-server architectures based upon server-attached disks. The server design is complex, since servers need to provide a great deal of functionality. Servers that fail or become overworked tend to disrupt file system operation. Since this form of distributed file system differs considerably from other shared storage designs, these designs can be classified as shared file manager, shared storage systems. The HPSS/SIOF project at Livermore National Laboratories is an example that uses a shared file manager to facilitate transfers between storage servers and clients.

I/O Interfaces

I/O interfaces transport data between computers and devices as well as among computers. Traditionally, interfaces fall into two categories: channels and networks. Computers generally communicate with storage devices via channel interfaces. Channels predictably transfer data with low-latency and high-bandwidth performance; however, channels span short distances and provide low connectivity. High-performance requirements often dictate that hardware mechanisms control channel operations.

Computers communicate with other computers through networks. Networks are interfaces with more flexibility than channels. Software controls substantial network operations, providing networks with flexibility but low performance.

Recent interface trends combine channel and network technologies into single interfaces capable of supporting multiple protocols. For instance, Fibre Channel (FC) is an emerging ANSI serial interface that supports channel and network operations. Fibre Channel supports traditional network protocols like Transmission Control Protocol/Internet Protocol (TCP/IP); Fibre Channel supports traditional channel protocols such as Small Computer System Interface (SCSI-3). Combined interfaces allow shared storage file systems to have high connectivity, connect long distances, and operating in unpredictable environments. A new term for I/O interfaces that support shared storage is storage area network (SAN). Shared storage devices that connect to SANs are also referred to as network attached storage (NAS) devices. The term NAS device refers to extent addressable storage systems connected to a network.

File System Layering

File system designers can construct complete file systems by layering, or stacking, partial designs on top of existing systems. The new designs reuse existing services by inheriting functionality of lower levels. For instance, NFS is a central-server architecture that utilizes an existing local file system to store and retrieve data on a storage device attached locally to the server. By layering NFS on top of local file systems, NFS software is free from the complexities of name space, file attribute, and storage management. NFS software consists of simple caching and transport functions. As a result, NFS benefits from performance and recovery improvements made to local file systems.

Other examples of file system layering include adding quota support to existing file system, strengthening consistency of cached data in an existing distributed file system, and a file system layer that compresses or encrypts files for a file system without such support.

Installable File System Interfaces

Most modern operating systems include installable file system interfaces to support multiple file system types within a single computer. In UNIX, the Virtual File System (VFS) interface is an object-oriented interface that supports various file system types within a single operating system. VFS occupies the level between the user/system call interface and installed file systems. Each installed file system provides the UNIX kernel with functions associated with VFS and vnode operations. VFS functions operate on whole file systems and perform tasks such as mounting, unmounting, and reading status. Vnode operations manipulate individual files. Vnode operations include opening, closing, creating, removing, reading, writing, and renaming files.

Vnode structures are the objects upon which vnode functions operate. A vnode is the VFS virtual equivalent of an inode. VFS creates and passes vnodes to file system vnode functions. Each vnode includes a pointer, called v_data, for file systems to attach private structures such as inodes.

While several UNIX implementations incorporate VFS, the interfaces differ slightly between platforms. Several non-UNIX operating systems, such as Microsoft Windows NT, have interfaces similar to VFS. Installable file system interfaces such as VFS allow multiple file system types within an operating system. Each system is capable of making calls to other file systems though the virtual file system interface. For instance, an NFS server may be implemented to access a local file system through VFS. In this manner, the server software does not need to be specifically coded for the local file system type; new file systems may be added to an operating system without reconfiguring NFS.

SUMMARY OF THE INVENTION

The present invention is a shared storage distributed file system that provides users and applications with transparent access to shared data stored on network attached storage devices. The file system uses layering techniques to inherit file management functionality from existing systems. Meta-data in the present invention is stored and shared among multiple computers by storing the meta-data as real-data in regular files of a standard, non-modified, client-server distributed file system. In effect, the standard client-server file system serves as the meta-data file system (MFS) for the present invention.

Real-data is stored on network attached storage devices attached to a storage area network. SFS benefits from direct network device attachment, since NAS devices off-load time-consuming data transfers from server computers. Furthermore, client computers operating under the present invention store file system meta-data on a meta-data file system. Using this meta-data, clients manage real-data stored on the network attached storage devices. The meta-data file systems also maintain the present file system name space and file attributes.

By utilizing an existing client-server system as a meta-data file system, the present invention is able to utilize the small-file access speed, consistency, caching, and file locking that is built into modern client-server file systems. Not only is development work reduced, but implementation is also simplified. Furthermore, future advances in client-server architectures are able to be incorporated easily and quickly.

DETAILED DESCRIPTION OF THE INVENTION

The present invention is a distributed file system that provides users and applications with transparent access to shared data found on storage devices attached directly to a network. This access is provided by utilizing existing, non-modified, client-server distributed file systems for meta-data storage. The client-server file system also provides file attribute and name space management. For purposes of this application, the present invention will be referred to as the Shared File System, or SFS.

Figure 1:
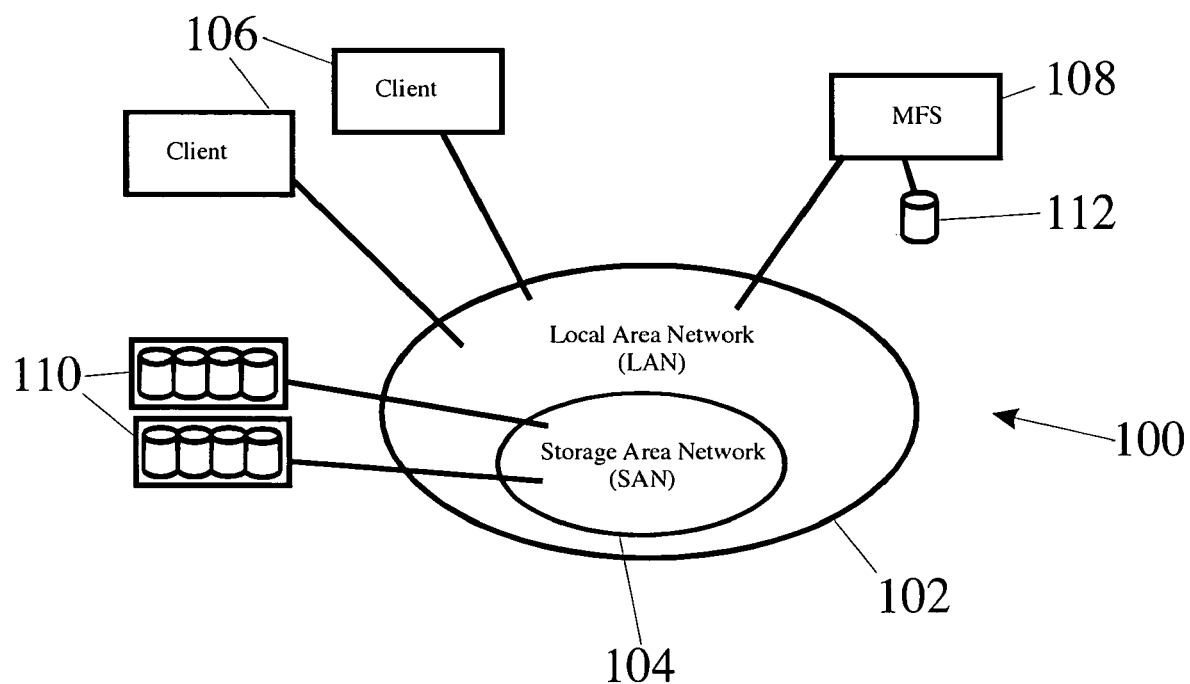
FIG. 1 is a representational drawing of a network environment utilizing a file system of the present invention.

Referring to FIG. 1, a network environment 100 is shown that utilizes a file system of the present invention. In the figure, network environment 100 has both a local area network (LAN) 102 and a storage area network (SAN) 104. The storage area network 104 is represented as a subset of the local area network 102 to illustrate that SAN 104 often exists merely as part of the LAN 102. For instance, Fibre Channel is an interface standard that can simultaneously support both local area network 102 and storage area network 104 traffic. However, it is conceivable and within the scope of this invention for the SAN 104 to be separate from the LAN 102, utilizing different interface protocols and different physical links than LAN 102. Example interfaces that could be used by SAN 104 include Fibre Channel, High Performance Parallel Interface (HiPPI), Intelligent Peripheral Interface (IPI-2) and Small Computer System Interconnect version 2 (SCSI-2). These SAN interfaces may utilize different protocols including SCSI-3 and IPI-3. Interfaces suitable for LAN 102 are Ethernet, Fibre Channel, and Asynchronous Transfer Mode (ATM). Examples of LAN protocols are Transmission Control Protocol (TCP) or User Datagram Protocol (UDP) on Internet Protocol (IP).

Attached to the LAN 102 are SFS clients 106 and a meta-data file system (MFS) server 108. The MFS server 108 has direct access to a local storage device 112. Attached to the SAN 104 are SFS clients 106 and network attached storage (NAS) devices 110. For the purposes of this invention, NAS devices 110 are considered to include all extent addressable storage systems connected to a network. Example NAS devices 110 include single disk drives, striped disks, disk arrays, solid-state storage devices, tape drives, tape robots, and even computers with locally-attached disks running special software that make disk storage extent addressable. These devices 110 communicate with the SFS clients 106 through SAN 104.

SFS is currently implemented in the Silicon Graphics IRIX 6.2 operating system under the Virtual File System (VFS) interface. SFS use the Sun Microsystems Network File System (NFS) as the meta-data file system. SFS stores real-data on Fibre Channel network attached SCSI devices. Fibre Channel may be used to communicate between MFS clients and servers, though an Ethernet LAN suffices. While these implementation details specify an existing, preferred embodiment, alternatives to one or all of these protocols would be obvious to one skilled in the art and are within the scope of the present invention. For instance, it would be obvious to one skilled in the art to utilize a Microsoft Server Message Block (SMB) based distributed file system or the Distributed File System (DFS) (a Distributed Computing Environment, or DCE, application based on the Andrew File System) as the meta-data file system.

Under the present invention, the MFS server 108 is actually operating an existing, prior art distributed file system, such as NFS. The meta-data requested by client 106 is like any other regular file for which the MFS server 108 is responsible. For instance, an SFS inode file that contains the block addresses of the real-data stored on the NAS devices 110 is simply a regular real-data file for the MFS server 108. SFS client software operating on clients 106 is responsible for storing the SFS meta-data in MFS regular files. Because of the structure of the SFS system, clients 106 are able to use the MFS directory structure and file attributes with very little modification.

The utilization of an unaltered distributed file system as a meta-data file system allows SFS to maintain meta-data consistency using the distributed file systems built-in file locking mechanisms. In addition, since most distributed file systems have good small file performance and failure recovery processes, such systems are ideal candidates for handling meta-data. The availability of the MFS to the network environment 100 can be enhanced using redundant servers 108, and devices 112, which is well known in prior art distributed file systems. Finally, this structure for handling meta-data files eliminates much of the complex and tedious tasks of directory and file attribute manipulation, caching, and consistency that are inherent in other techniques for shared storage file systems.

Multiple File Systems

Figure 2:
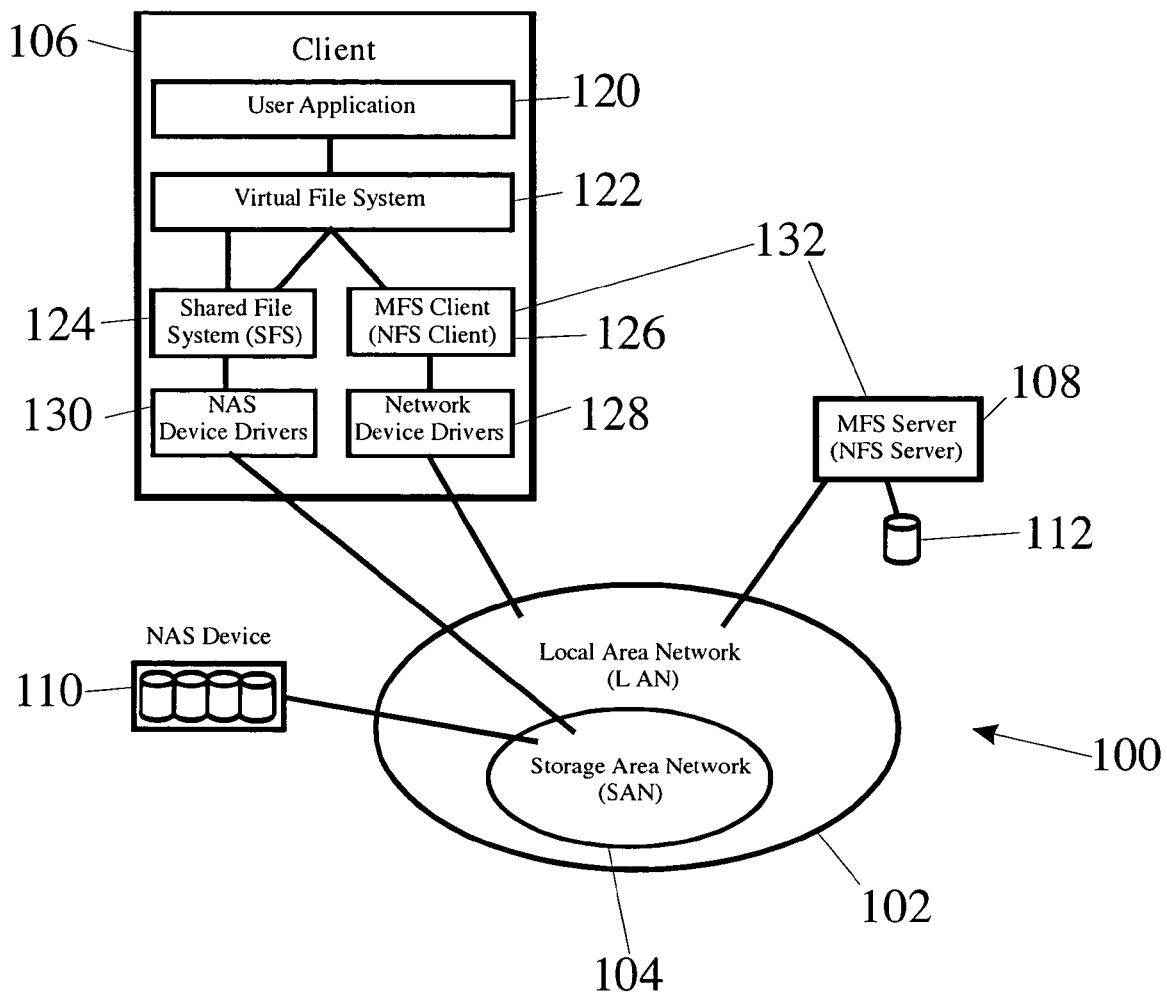
FIG. 2 is a representational drawing of the network environment of FIG. 1, showing additional details of the client element.

In order for the SFS system to utilize an existing client-server file system as the MFS 108, it is necessary for the client-server system to be operating and accessible to the SFS software running on client 106. One method of accomplishing this is to implement SFS on a system allowing for multiple file systems to coexist. In the preferred embodiment, SFS is implement through the use of the UNIX Virtual File System interface (VFS). FIG. 2 illustrates the utilization of the VFS interface 122 on SFS client 106. User application 120 is a program running in user space on client 106. When the application 120 needs to store or retrieve file data stored on an SFS file system, the application 120 makes the request to the operating system. The request is received by the kernel-level, Virtual File System (VFS) interface 122, which routes the request to SFS software 124.

In order to access file data on NAS device 110, SFS software 124 must receive the inode file (meta-data) for the file from the meta-data file system 132, which is comprised of the MFS client 126 and the MFS server 108. To obtain this meta-data, SFS software 124 makes a request for the file containing the meta-data through VFS 122. The VFS 122 routes this request to the MFS client (NFS client) software 126. The MFS client software 126 forwards the request to the MFS server 108 through network device drivers 128 and the local area network 102. The MFS server 108 then retrieves the requested file from local storage 122, and returns the file to the requesting MFS client software 126. MFS server 108 may also be utilizing the Virtual File System interface to coordinate communication between the request from the MFS client 126 and a local file system controlling data on local storage 112.

The meta-data file received by MFS client software 126 is then returned to SFS software 124 via the VFS interface 122. When the SFS software 124 receives the inode file, SFS software 124 then transfers the real-data through the NAS device drivers 130 of the client 106. These drivers 130 access one or more of the NAS devices 110 connected to the storage area network 104. The NAS device drivers 130 may consist of multiple layers of drivers. One layer may control single NAS devices 110 and a higher layer may group single devices into logical NAS devices 110.

As seen in FIG. 2, the meta-data path of the present invention is considerably longer than the real-data path. However, meta-data may be cached on the SFS client 106 or in the main memory of the MFS server 108 through standard caching and consistency mechanisms built into the MFS client-server architecture. The SFS software 124 may cache real-data in SFS client 106 main memory, though SFS software 124 may bypass caching for large requests with no locality. SFS software 124 maintains real-data consistency by comparing the time data is cached with the modification time of the inode file retrieved from MFS server 108. If these times differ, the cached data is invalid.

In functioning in this manner, the application program 120, the VFS interface 122, the MFS client software 126 and MFS server 108, the device drivers 128, 130, and the storage devices 110, 112 all operate without alteration from the previously known prior art. In other words, the present invention allows the implementation of a shared storage distributed files system merely by operating SFS software 124 on SFS clients 106.

Meta-Data Consistency

Figure 3:
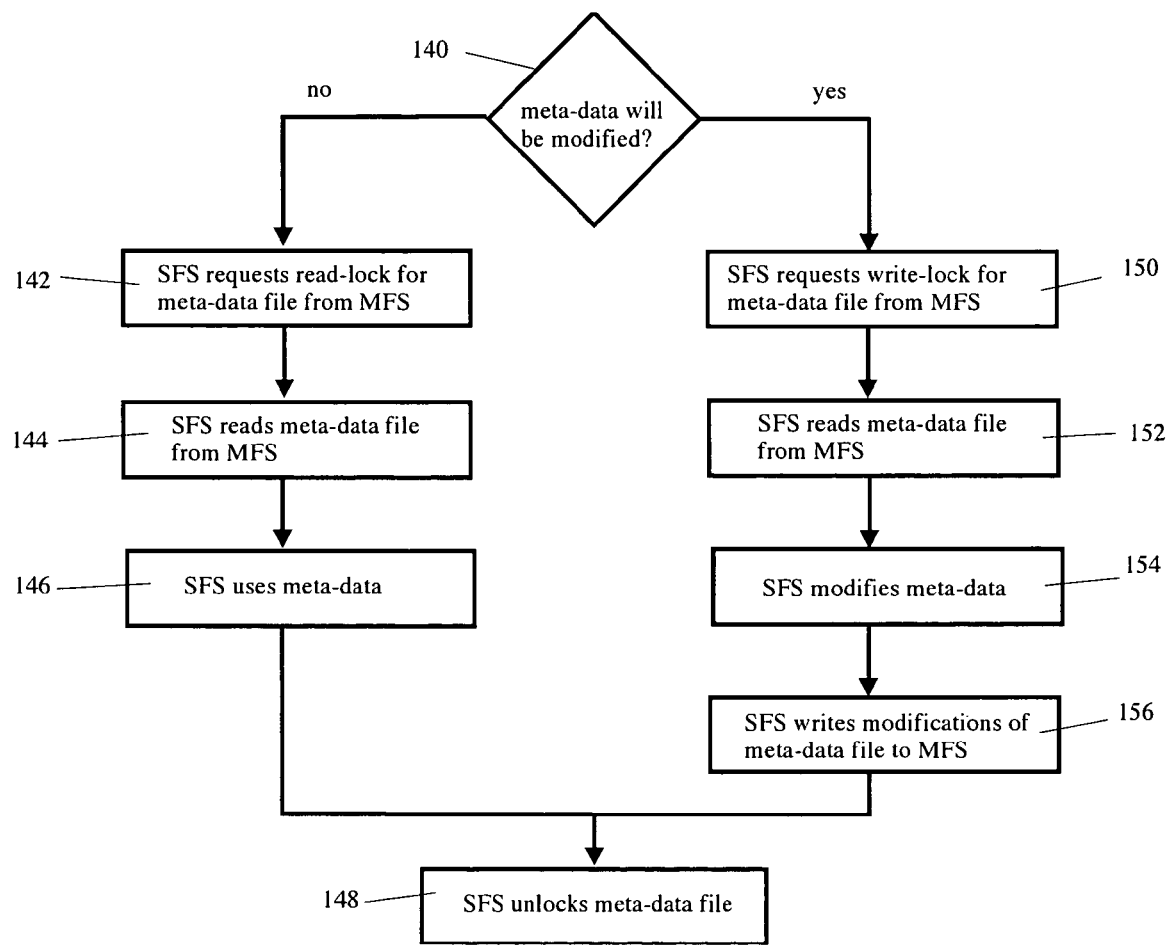
FIG. 3 is a flow chart showing the basic structure of meta-data file consistency management of the present invention.

SFS clients 106 manage meta-data file consistency using file locking mechanisms built into MFS 132. Both read-locks and write-locks can be placed on files in MFS 132. MFS 132 grants read-locks when a file is not locked or is locked with other read-locks; MFS 132 grants write-locks when a file is not already locked. FIG. 3 illustrates how SFS software 124 utilizes MFS 132 file locking mechanisms when accessing meta-data files. At step 140, SFS 124 decides whether the meta-data is to be modified. If SFS 124 intends to modify the meta-data, SFS 124 submits to MFS 132 a write-lock request for the meta-data file at step 150. If SFS 124 intends to access without modifying the meta-data, SFS 124 submits to MFS 132 a read-lock request for the meta-data file at step 142. SFS 124 must wait for the lock requested in steps 142 or 150 to be granted by MFS 132 before proceeding to steps 144 or 152. By requiring write-lock on an SFS meta-data file before the file can be modified, it is impossible to modify a meta-data file that is currently being utilized by another client 106. Similarly, the requirement of obtaining a read-lock before use prevents the use of a meta-data file that is currently being modified by a different client.

At steps 144 and 152, SFS 124 submits to MFS 132 read requests for the meta-data file. At step 146, SFS 124 uses the meta-data without modification. After step 146, the process continues to step 148. On the modify branch at step 154, SFS 124 modifies the meta-data. This branch continues to step 156, where SFS 124 submits to MFS 132 write requests of the modified meta-data file. The process ends at step 148 where SFS 124 unlocks the meta-data file.

SFS Meta-Data

Figure 4:
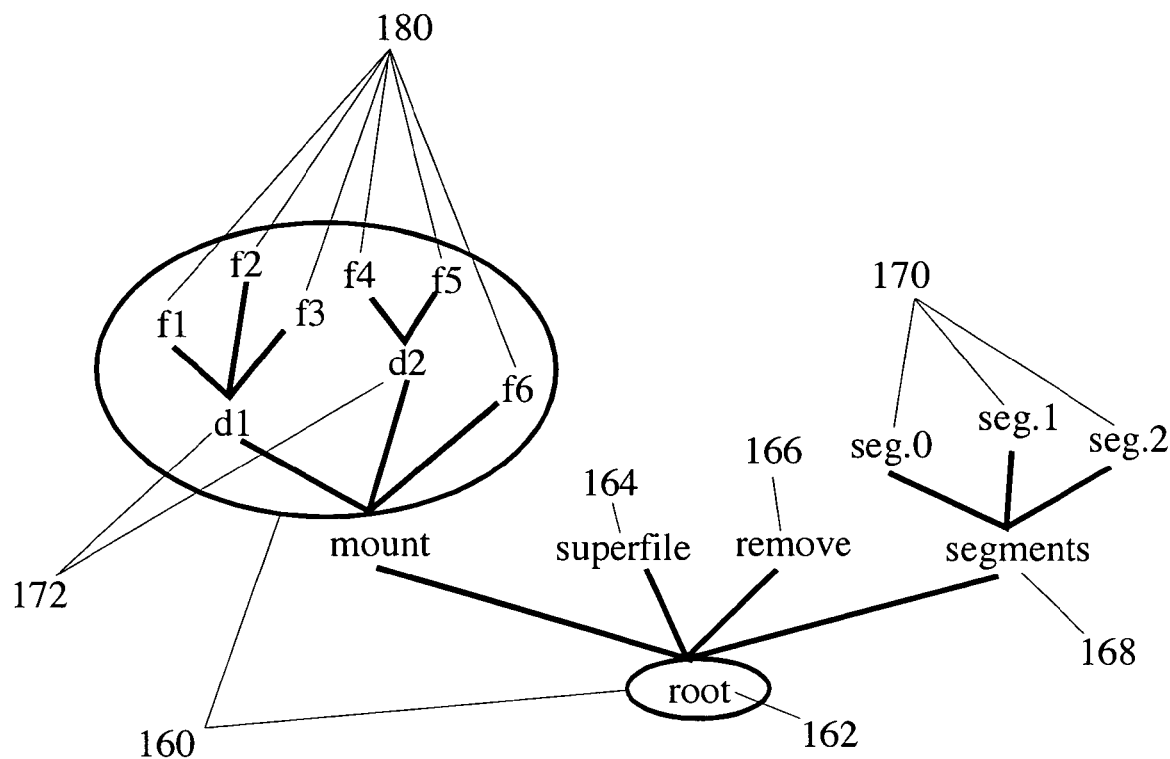
FIG. 4 is a representational drawing of a directory structure that the present invention stores in the name space of the meta-data file system.

SFS 124 stores meta-data files in an MFS 132 directory structure shown in FIG. 4. These files are not directly accessible to user applications 120, but rather are utilized by the SFS software 124 to store information about the NAS devices 110 and the real-data file stored on these devices 110. This information includes system wide information, such as superfile 164, the remove directory 166, and segment files 170; as well as inode files 180 which contain information on the various files in the file system. Most of the meta-data is contained in the superfile 164, the segment files 170, and the inode files 180. Table 1 lists the specific contents of these three main types of meta-data files. The remove directory 166 is used only for temporary storage of files prior to deletion.

SFS 124 utilizes the name space and directory structure of the inode files 180 on MFS 132 to maintain the name space and directory structures for the real-data files stored on NAS devices 110. By allowing application programs 120 to view the file locations and directory structure of the inode files 180 on MFS, there is no need for SFS to maintain a separate file structure. SFS software 124 also does not need to manage directory and link files. SFS 124 forwards, without modification, directory and link file requests between the user application 120 and MFS 132.

The circled areas 160 in FIG. 4 enclose user visible files and directories and thereby show the name space for SFS 124. In this Figure, inode files f1 through f6 (180) in subdirectory tree are SFS inode files stored as MFS 132 regular files. Directories d1 and d2 (172) are standard MFS 132 directories. The SFS file system is mounted on the directory called root 162. The name space subdirectory tree 160 rooted at root/mount is also visible to users. For instance, users access file f4 with the path root/d2/f4. SFS 124 translates the user path into root/mount/d2/f4 in order to access the f4 inode file stored on MFS 132. FIG. 4 also shows that the other meta-data files such as the superfile 164, the remove directory 166, and the segments directory 168 are not visible to user applications 120.

Superfile

As was shown in FIG. 1, each network environment 100 utilizing the SFS file system consists of one or more shared NAS devices 110 attached to the SAN 104. Several NAS storage devices 110 may form a logical volume to comprise a single, logical device. SFS 124 stores information about logical NAS devices 110 in a meta-data file called a superfile 164. This device information includes the device name, number, and capacity.

The superfile 164 also contains the file system block size. This block size is a multiple of the least common multiple of all client computers 106 page sizes. Suppose some clients 106 have 4096 byte page size and other have 16384 byte page sizes. The file system block size needs to be at least 16384 bytes but could be 32768 bytes or 65536 bytes. The choice of block size is a tradeoff between performance and storage efficiency. Larger block sizes require less meta-data transfer and reduce external fragmentation, but reduce storage efficiency since partially filled, large blocks waste more space than partially filled, small blocks.

Segment Files

SFS 124 partitions logical NAS devices 110 into multiple segments in order to exploit parallelism in the network environment 100. Segmentation allows multiple processes to simultaneously allocate and de-allocate file data. Each segment contains multiple data blocks found on NAS device 110, and has its own allocation table associated with these data blocks. Allocation tables store information about currently unused data blocks that are available to be allocated to file. These allocation tables are implemented via bitmap tables, as is well-known in the prior art. Each of the segment files 170 contains the allocation table associated with that segment. SFS software 124 retrieves and modifies the appropriate segment files 170, designated by segment file number, during file allocation, file de-allocation, and file system statistic gathering operations.

Inode File

Figure 5:
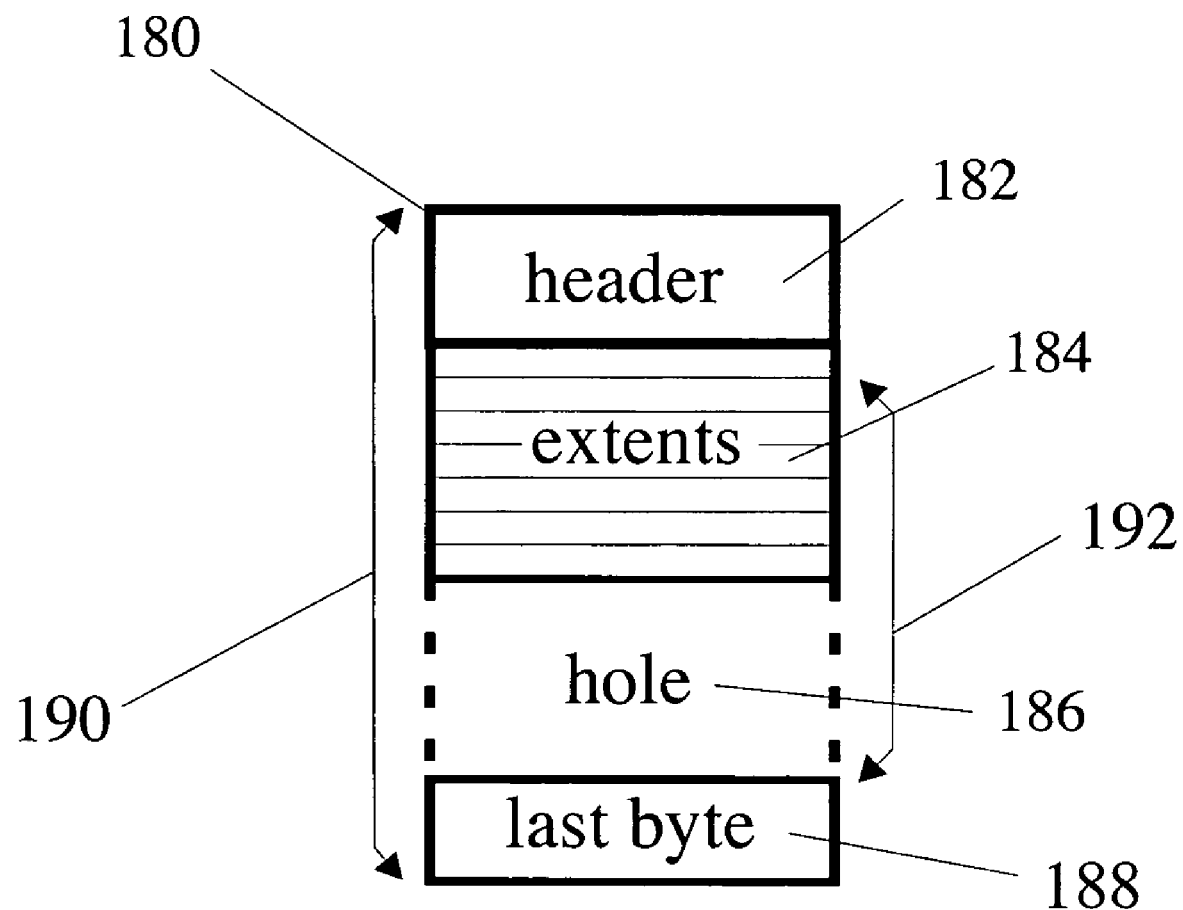
FIG. 5 is a representational drawing of an inode file data layout of the present invention.

FIG. 5 illustrates an inode file 180. Each inode file 180 maintains information pertaining to a single SFS 124 regular file stored on an NAS device 110. Since MFS 132 treats inode files 180 as real-data, MFS 132 maintains file attributes for each file, such as file name, ownership, access privileges, access, creation, and modification times, and file size. SFS uses these inode file attributes as the attributes for the associated SFS file. In this manner, SFS 124 is freed from the overhead of maintaining file attributes. File attribute requests received from user application 120 can be forwarded to MFS 132 with little overhead. Responses from MFS 132 can similarly be forwarded back to the inquiring user application 120.

Each inode file 180 contains a list of extents that address data blocks storing file real-data. To minimize meta-data space, each extent 184 may address several consecutive device data blocks. To indicate all the necessary addressing information, each extent 184 includes a flag, the segment number of the segment containing the real-data, the block offset into the segment, and the number of blocks within the extent that contain real-data. The flag determines whether or not the extent addresses real-data or a hole in the file.

Some file attributes are not maintained directly by MFS 132. As a result, each inode file 180 also contains a fixed-size header 182 for such attributes and any additional information not maintained by MFS 132, such as the number of extents in the inode.

SFS 124 cannot determine file size based upon the amount of normal inode data, since a file's meta-data is typically only a small fraction of the size of the file's real-data. Rather than store the real file size in the inode header, SFS 124 appends a single byte, the last-byte 188, to the inode file 180 beyond the end of the list of extents 184. This last-byte 188 is positioned at an offset that creates an empty space or hole 186 in the inode file 180. This hole 186 requires almost no storage space on MFS 132, yet increases the file size of the inode file 180 by the length of the hole 186. SFS 124 can then translate the inode file size 190 to the real file size 192 by subtracting a constant length from the inode file size 190 maintained by MFS.

In the preferred embodiment, SFS 124 calculates the file size 192 by subtracting the size of the header 182, one extent 184, and one byte from the inode file size 190. For instance, an empty file has a file size 192 of zero. The inode file 180 of this empty file has a length equal to the size of the header 182, one extent 186, and the last-byte 188.

SFS 124 supports user level record locking by placing MFS 132 record locks on inode files 180. SFS 124 forwards user lock requests to MFS 132 with the slight modification to the requested lock record, in that SFS 124 increments the byte offset of the lock record by the size of the inode file header 182. Since inode file sizes 190, including holes 186, are always larger than the real file size 192, adjusted lock record offsets fall within the real file size 192 range. Other clients 106 requesting record locks at the same file locations will receive a notice, originating from MFS 132 and forwarded by SFS 124, that the requested records are already locks.

SFS and the VFS Interface

As shown in FIG. 2, SFS 124 is accessible through the VFS interface 122. User application 120 requests route through the VFS interface 122 to SFS software 124. Furthermore, SFS 124 makes meta-data requests through VFS 122 to the meta-data file system client 126. SFS 124 maintains MFS client 126 vnodes for directories, links, and meta-data files.

SFS 124 maintains several structures during the course of file operations, including an SFS vnode, an in-core SFS inode, and an MFS vnode. For each open file, the kernel retains pointers to the corresponding SFS vnode. The VFS interface 122 passes this pointer to all SFS vnode routines.

SFS 124 maintains an in-core inode for each regular file. This inode contains a copy of the inode file header 182, and some or all of the file extents. The SFS inode also includes a pointer to the MFS vnode of the inode file 180. SFS 124 routines pass this MFS vnode pointer to MFS 126 vnode routines. Using MFS file locks, SFS 124 maintains consistency between the in-core inode and the inode file 180.

SFS software 124 maintains similar structures for directories and links. Like regular files, directory and link structures include an SFS vnode, an SFS inode, and an MFS vnode. Since SFS 124 redirects directories and links requests to MFS 132, SFS 124 maintains no extent lists. MFS 132 manages directories and links without SFS 124 intervention.

Basic File System Operations

The basic file system operations are creating a file, writing to a file, reading from a file, and removing a file. These operations require other operations such as reading and writing inode files as well as allocating and de-allocating files.

File Creation

Figure 6:
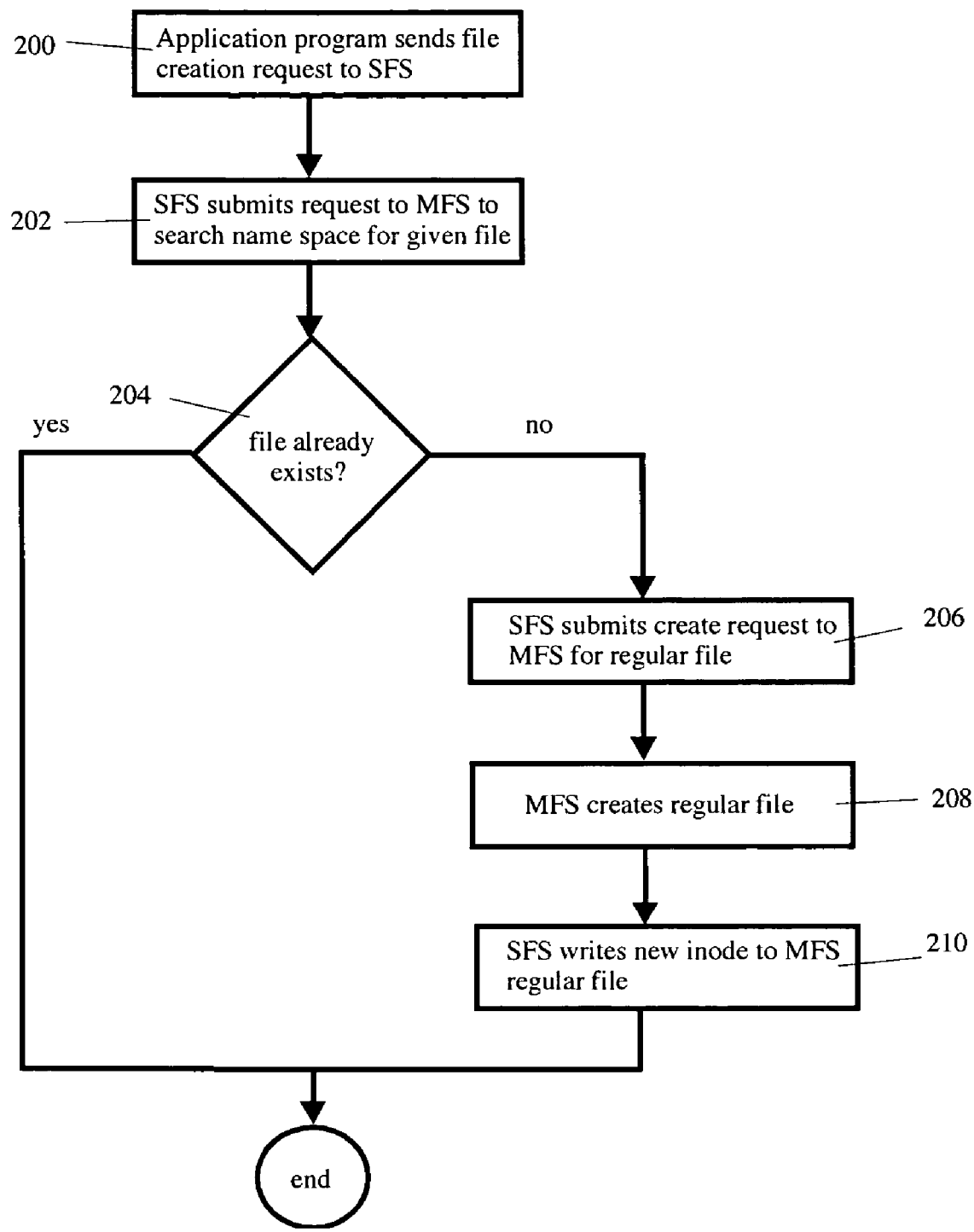
FIG. 6 is a flow chart showing the basic structure of the file creation process of the present invention.
Figure 10:
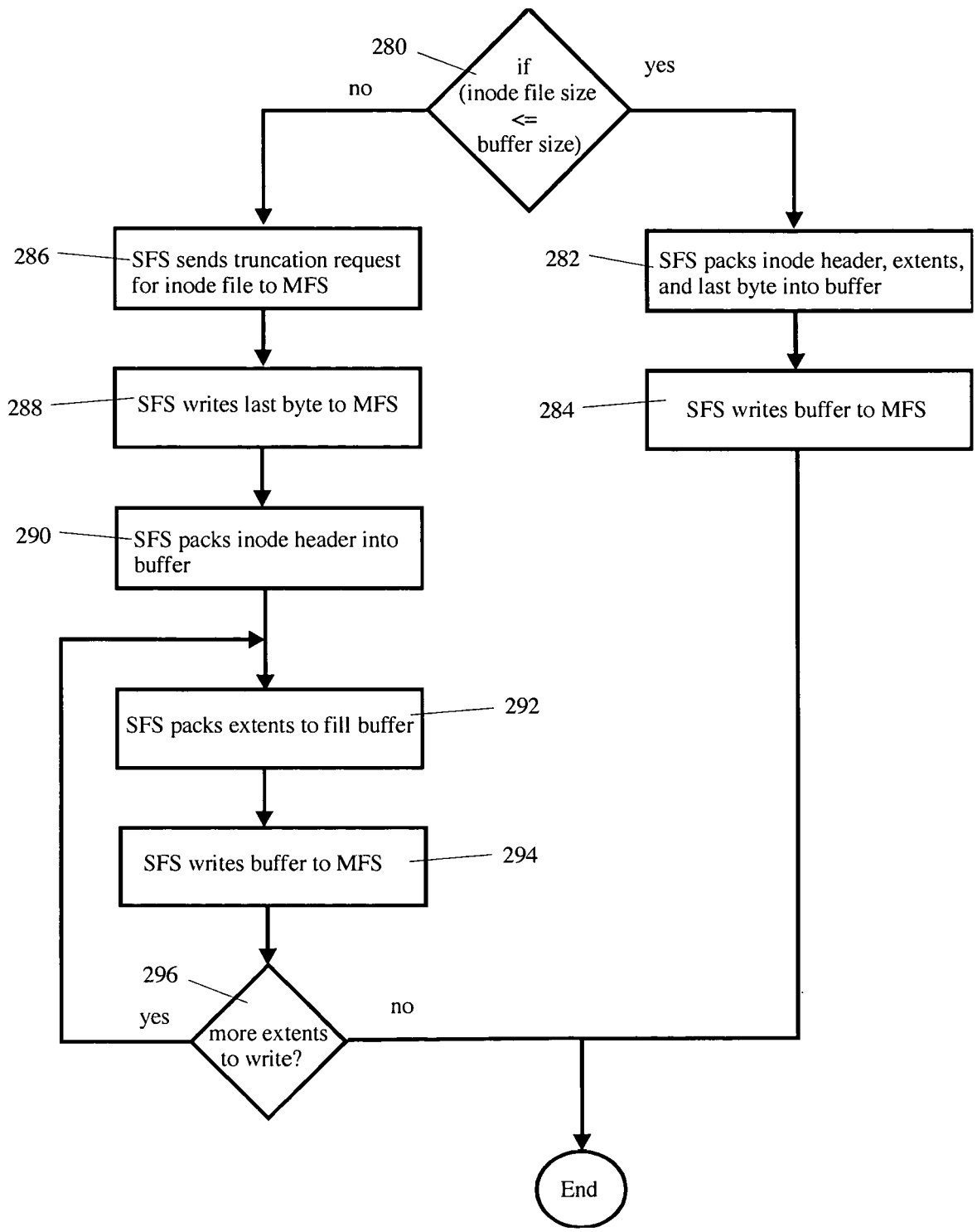
FIG. 10 is a flow chart showing the basic structure of updating an inode of the present invention.

A file creation operation of the present invention is illustrated in the flow chart shown in FIG. 6. The process starts by an application program 120 running on one of the SFS clients 106 desiring to create a new file. The application program 120 submits a create request to the SFS software 124, as shown in step 200. At step 202, the SFS software 124 receives this request, and then summits a request to MFS 132 for a name space 160 search for the file name given by the application program 120. If, at step 204, MFS 132 indicates that the file already exists, the operation concludes. However, if the file does not already exist, SFS 124 submits a request to MFS 132 to create the file. At step 208, MFS 132 creates a regular file for SFS 124. At step 210, SFS 124 writes an inode file 180 to this newly created regular file. Since no data has been allocated to the SFS file, the inode file 180 contains no valid extents 184. The process of writing an inode file to MFS 132 is described in more detail below in connection with FIG. 10. The file creation process then completes.

File Reads and Writes

Figure 7:
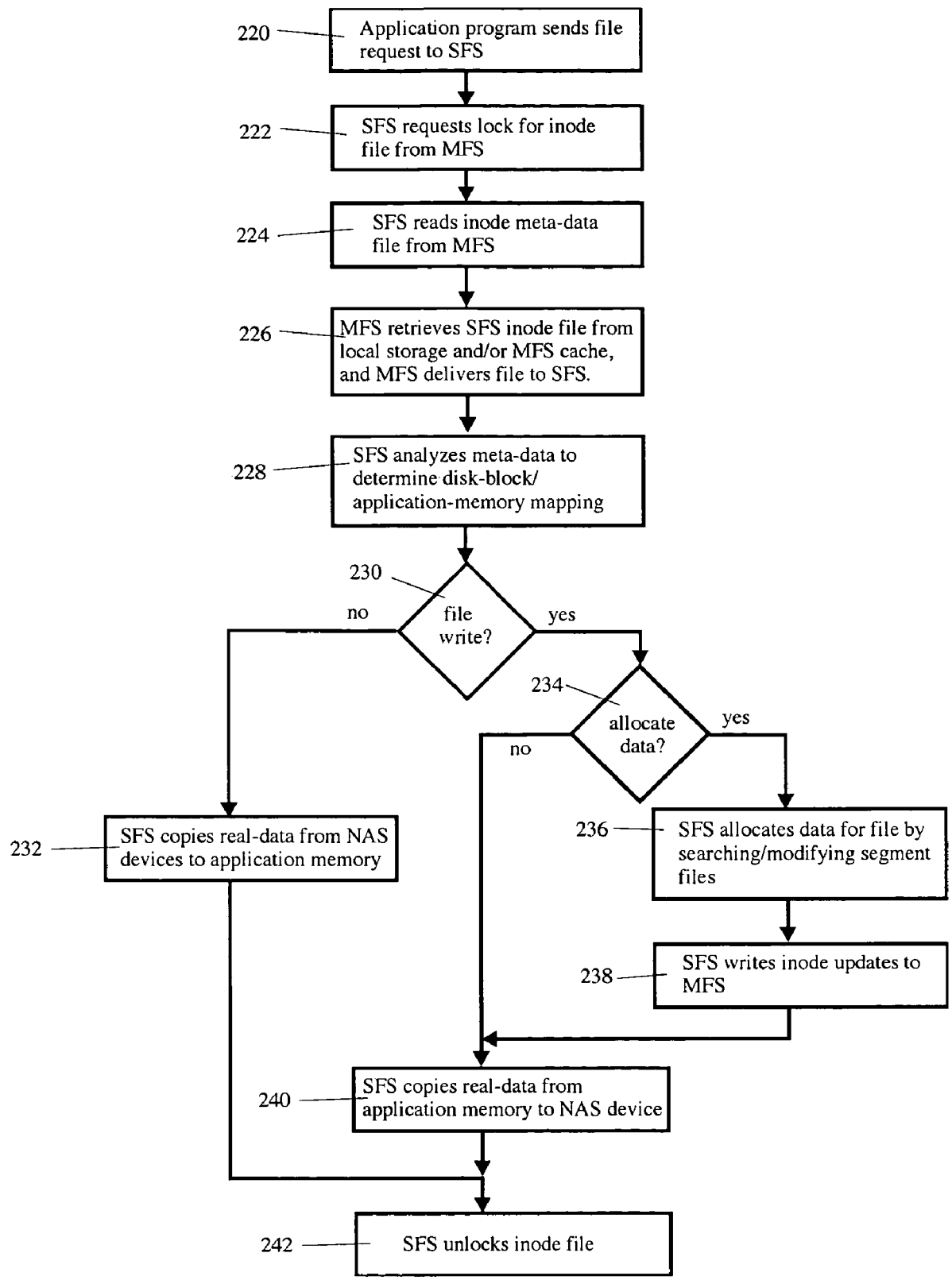
FIG. 7 is a flow chart showing the basic structure of reading and writing file data of the present invention.
Figure 9:
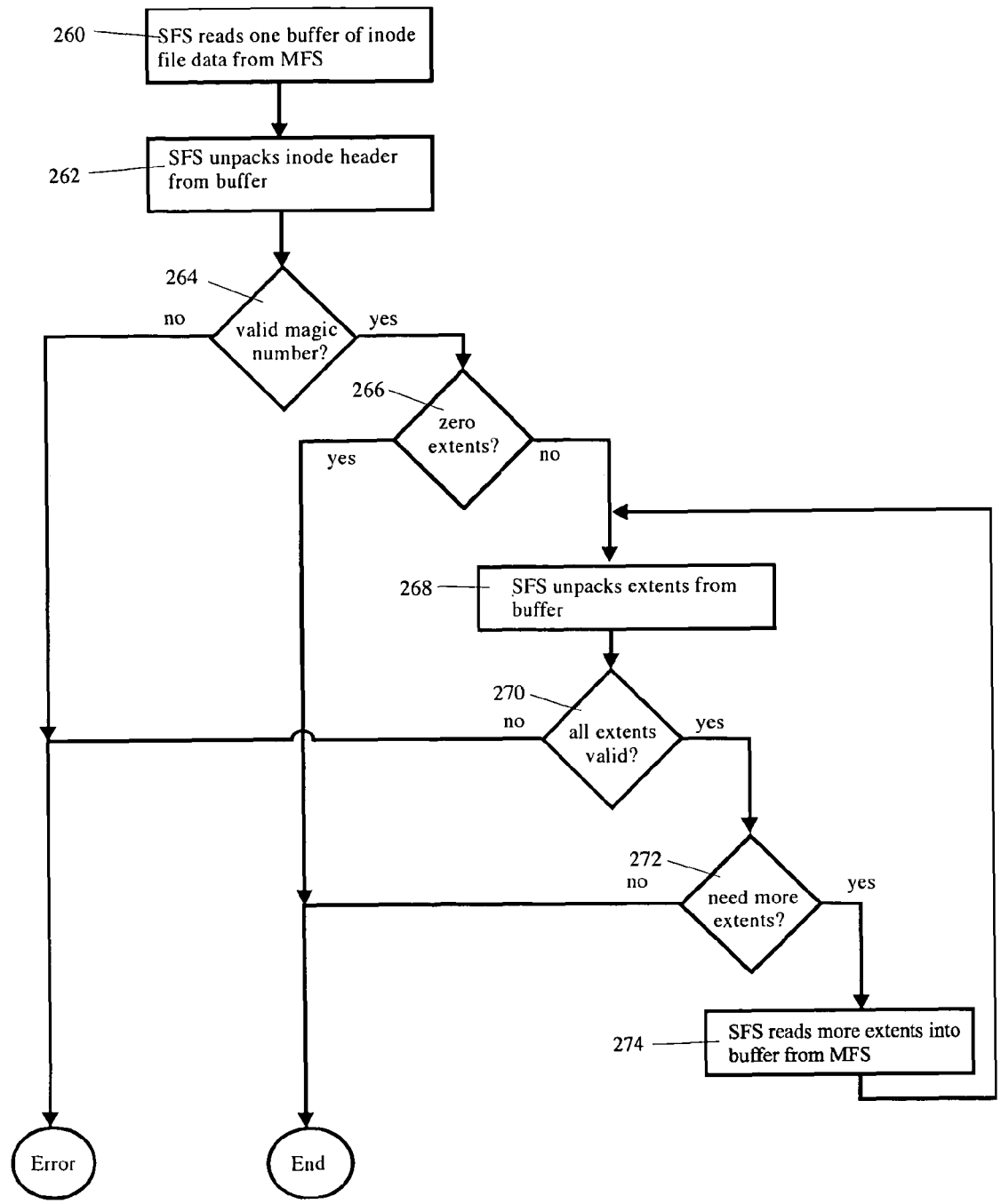
FIG. 9 is a flow chart showing the basic structure of retrieving an inode file of the present invention.

Read and write operations are illustrated in the flow chart shown in FIG. 7. The process starts by application program 120 desiring to transfer program data between user memory and a file. The application 120 submits either a read or a write request to SFS 124, as shown in step 220. At step 222, the SFS software 124 receives this request, and in turn submits to MFS 132 a lock request for the inode file 180 corresponding to the real-data file. MFS 132 grants the lock when it becomes available. After the inode file is locked, SFS 124 reads the inode file 180 from MFS 132, as shown in step 224. Reading an inode file is shown in more detail in FIG. 9.

The request made at step 224 is now seen to be simple requests for regular file data from the client-server file system operating as the MFS 132. In step 226, MFS 132 retrieves the requested file from local storage 112 or MFS cache, and MFS 132 delivers the file to client 106. SFS 124 receives the meta-data for the requested file from MFS 132, and in step 228 determines how to map the application 120 request to NAS devices 110 disk blocks.

If the application program 120 submits a read request in step 220, as determined at step 230, SFS 124 retrieves data blocks from devices 110 and delivers real-data to the application program 120 at step 232. Once the step 232 transfer is complete, SFS 124 submits a request to MFS 132 to unlock the inode file 180 at step 242.

If the application program 120 submits a write request in step 220, SFS 124 must decide at step 234 whether additional data blocks stored on NAS devices 110 need to be allocated. If SFS 124 determines that no new data needs to be allocated to the SFS file, SFS 124 at step 240 writes the application 120 data to the devices 110. At step 242, SFS 124 completes the operation by submitting a request to MFS 132 to unlock the inode file 180.

Figure 11:
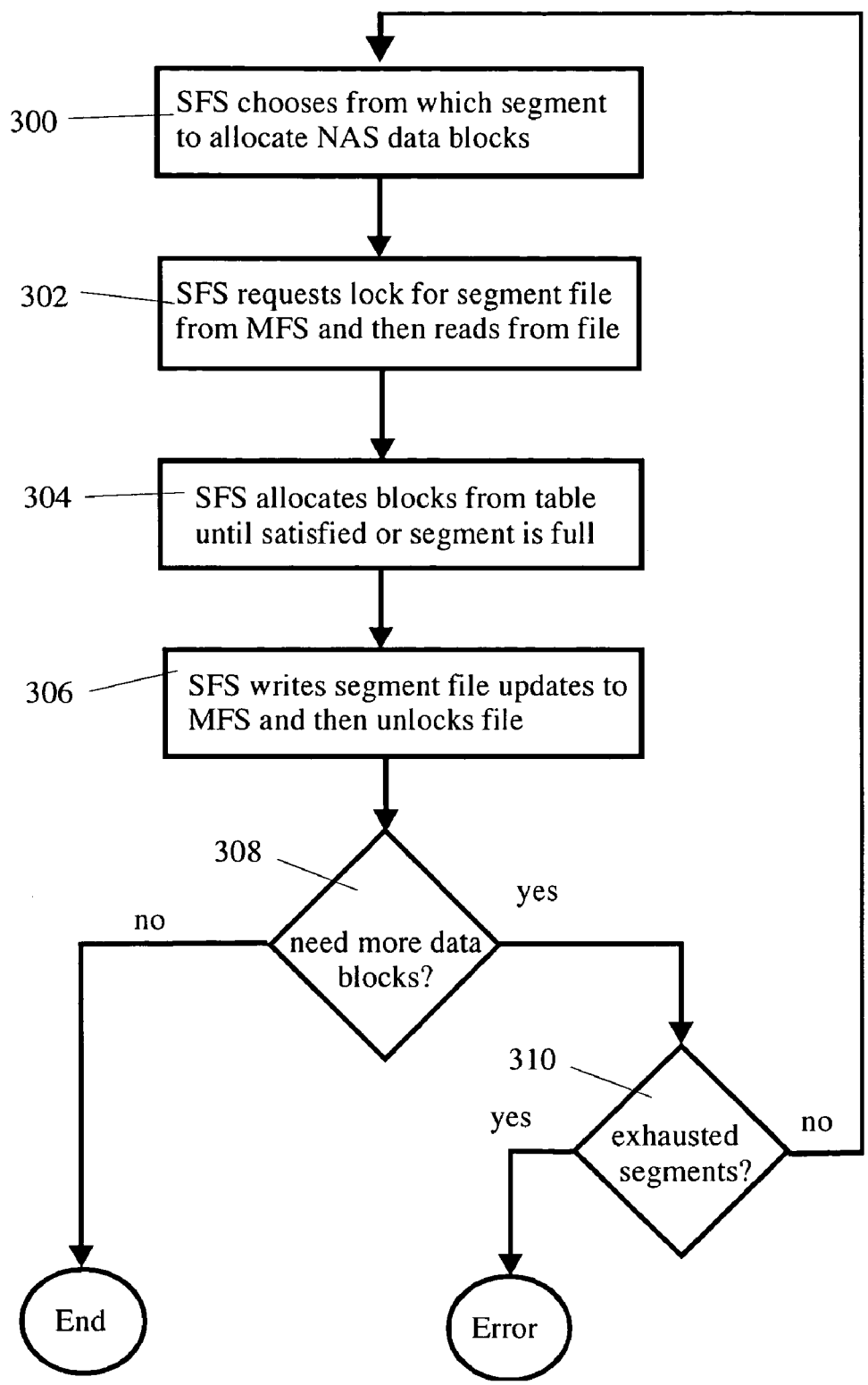
FIG. 11 is a flow chart showing the basic structure of storage block allocation of the present invention.

If, at step 234, SFS 124 determines data must be allocated to the SFS file, SFS 124 must read and alter one or more segment files 170 stored on MFS 132 at step 236. This step is shown in more detail in FIG. 11. At step 238, SFS 124 then updates the inode file 180 and saves it to MFS 132. This latter step is further explained in connection with FIG. 10. The process continues to step 240 as explained above.

File Removal

Figure 8:
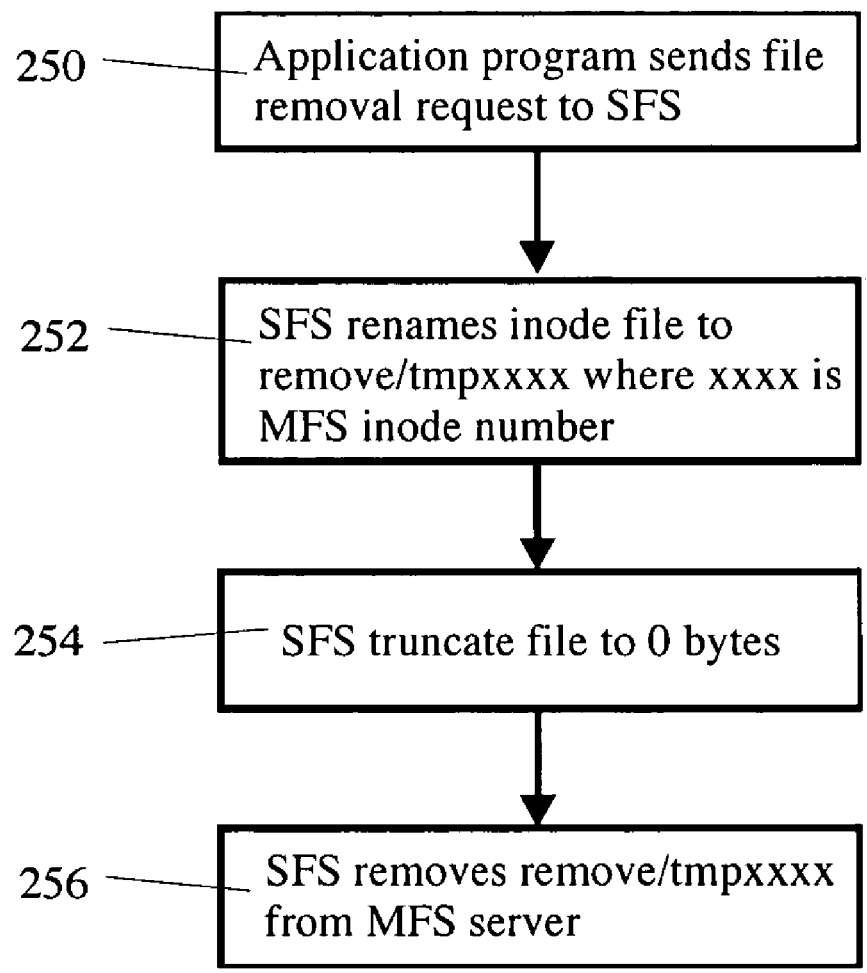
FIG. 8 is a flow chart showing the basic structure of the file removal process of the present invention.

A file removal operation of the present invention is illustrated in the flow chart shown in FIG. 8. The process starts by an application program 120 desiring to remove an existing file. The application program 120 submits a remove request to the file system of the present invention, as shown in step 250.

Figure 12:
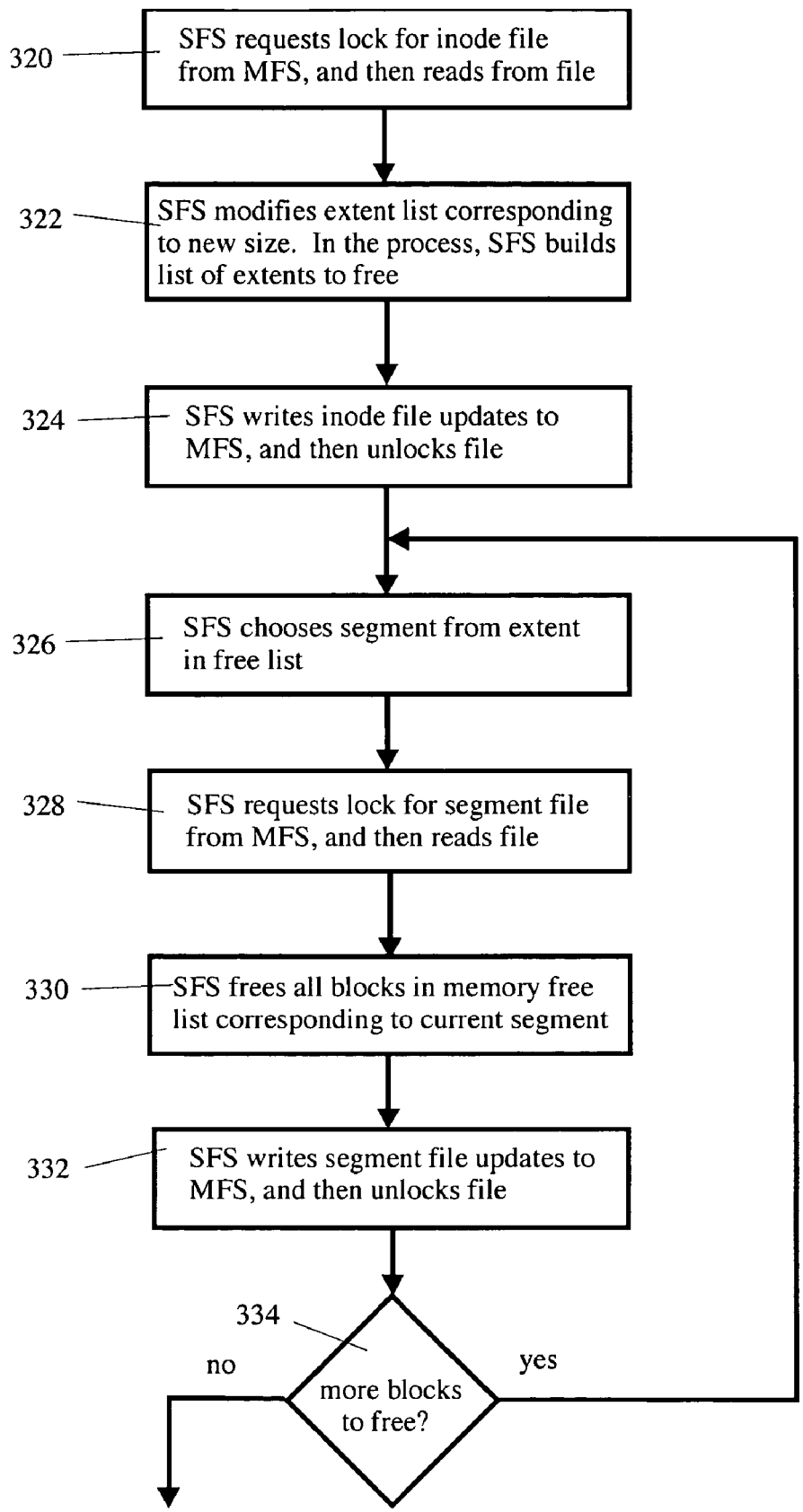
FIG. 12 is a flow chart showing the basic structure of file truncation of the present invention.

Removing a file in a file system like NFS requires several state transitions. Given a failure between any state, the file system may become inconsistent. To compensate, SFS 124 modifies the name space 160 of MFS 132 before removing a file. At step 252, SFS 124 renames the inode file 180 corresponding to the SFS regular file marked for removal. This inode file 180 is moved to the SFS 124 remove directory 166 and renamed to a unique name allocated by the file system. In the preferred embodiment, SFS 124 uses the MFS 132 inode number of the file to create a unique name. At step 254, SFS 124 truncates the file to zero bytes in length. This truncation de-allocates the file data blocks. SFS 124 then removes the inode file 180 from the remove directory 166 in step 256 by issuing a remove command to MFS 132. Data block de-allocation is further explained in connection with FIG. 12.

Inode File Read

SFS software 124 periodically needs to read inode files 180 from MFS 132. The process is illustrated in the flow chart shown in FIG. 9. Starting at step 260, SFS 124 reads the inode file 180 from MFS 132 as a regular file. Since the inode file 180 may contain many extents and occupy thousands of bytes of data, SFS 124 reads only a fixed size buffer of data at one time. MFS 132 transfers a portion of this file to the SFS buffer memory. At step 262, SFS 124 unpacks the inode header 182 from the inode file 180 into a memory structure. At step 264, SFS software 124 verifies the consistency of the inode magic number. If this magic number is invalid, the process terminates with an error. If the magic number is valid, SFS 124 assumes the inode header 182 is valid. At step 266, SFS 124 checks the number of extents field of the header 182. If this field indicates that there are zero extents in the inode extent list 184, the process terminates successfully.

If the inode header 182 indicates the inode contains extents, the process continues to step 268. At step 268, SFS 124 unpacks all extents in the current buffer into SFS client 106 memory. At step 270, SFS 124 verifies the consistency of each extent by checking for valid extent flags. If any extent is invalid, the process terminates with an error. If all extents in the buffer are valid, at step 272, SFS 124 determines if the inode file 180 contains extents not yet read. When copies of all extents are in SFS client 106 memory, the process completes successfully. If more extents need to be read, SFS 124 reads another buffer from MFS 132 and returns to step 268.

Inode File Write

SFS software 124 periodically needs to write inode files 180 to MFS 132. The process is illustrated in the flow chart shown in FIG. 10. Starting at step 280, SFS 124 determines if the inode file 180 can be transferred with one write request. If the inode file size 190 is less than or equal to the write buffer size, the process proceeds to step 282. At step 282, SFS 124 packs the inode header 182, extent list 184, and last-byte 188 into the write buffer. SFS 124 then writes this buffer to MFS 132 as file real-data. The process completes successfully after step 284.

If at step 280 the inode file size 190 is greater than the write buffer, the process continues to step 286. SFS 124 proceeds to request that MFS 132 truncate the inode file 180 to zero bytes in length. At step 288, SFS 124 writes the last-byte 188 to MFS 132 at the inode file size 190 offset. Then, SFS 124 packs the buffer with the inode header 182. At step 292, the buffer is not full, so SFS 124 packs the remaining buffer space with inode extents. Once the buffer is full, SFS 124 writes the buffer to MFS 132 as file real-data. At step 296, if more extents need to be written, the process returns to step 292. Once the entire extent list 184 is written, the process completes.

Block Allocation

During a file write, SFS software 124 may need to allocate storage from the network attached storage devices 110. The process is illustrated in the flow chart shown in FIG. 11. Starting at step 300, SFS 124 chooses the segment from which to allocate data blocks. This selection may be random or follow a more advanced heuristic. The goal of the section is to balance system level accesses across all segments as well as attempt to allocate sequential storage blocks for the file. Once a segment is chosen, the process continues to step 302. At step 302, SFS 124 requests a write-lock of the segment file 170 from MFS 132. SFS 124 proceeds to read the segment data from this MFS 132 file. At step 304, SFS 124 searches through the segment allocation table for free blocks. SFS 124 allocates blocks until the allocation request is satisfied or all segment blocks are allocated. At step 306, SFS 124 proceeds to write and unlock the modified segment file 170 stored on MFS 132. If the allocation request is complete, the process ends successfully. If the allocation request is not complete, SFS 124 attempts to select a different segment. If such a segment exists, the process returns to step 300 and selects this segment for allocation. If SFS 124 has exhausted all segments and requires additional blocks, the process terminates with an "out of space" error.

File Truncation

File truncation occurs during file removal or a truncation request from an application program 120. During truncation, SFS 124 modifies the inode file size 190 and possibly de-allocates storage of network attached storage device 110 blocks. The process is illustrated in the flow chart shown in FIG. 12. Starting at step 320, SFS 124 locks the inode file 180 by acquiring a write-lock of the file from MFS 132. Once the lock is granted by MFS 132, SFS 124 reads the inode file 180. At step 322, SFS 124 appropriately modifies the inode extent list 184. In the process, SFS 124 builds a memory list of extents to free. At step 324, SFS 124 writes the modified inode file 180 back to MFS 132 and then unlocks the inode file. The process proceeds to step 326. From the list of extents to free, SFS 124 selects a segment to begin de-allocation. At step 328, SFS 124 locks and reads the segment file 170 from MFS 132. At step 330, SFS 124 frees all blocks in free list corresponding to the current segment. SFS 124 then writes the modified segment file 170 to MFS 132 and unlocks the segment file 170. If the extent list contains additional extents to free, the process returns to step 326. Once all extents are freed, the process terminates successfully.

Failure Recovery

Failure recovery is a vital element of distributed systems. Recovery must be timely, and damage caused by corrupted meta-data must be limited to single files rather than entire file systems. File system layering provides the present invention with a great deal of protection. By layering SFS 124 on top of MFS 132, MFS 132 manages name space, file locking, and meta-data file recovery.

MFS 132, however, does not facilitate consistency between meta-data update operations. Without atomic meta-data updates, a failure while modifying meta-data may leave an SFS file system in an inconsistent state. To compensate, SFS 124 sequences meta-data update operations in an order that contains such inconsistencies to single files or permits repairable inconsistencies.

For instance, during file allocation, SFS 124 updates segment file 170 allocation tables before updating inode files 180. If a failure occurs before the inode 180 is updated, the segment file 170 becomes inconsistent with the remainder of the file system. The allocation table reflects data blocks as allocated, though no inode 180 points to these blocks.

During file de-allocation, SFS 124 updates inode files 180 before modifying segment files 170. If a failure occurs before the segment files 170 are updated, the allocation tables indicate blocks as erroneously allocated. These inconsistencies are temporary, since SFS utilities can dynamically repair segment files 170.

Segment inconsistencies do not affect normal file system operation, with the temporary exception that less storage space is available. SFS utilities provide a recovery tool to repair this inconsistency. The tool reads through all inode files 180 and creates a list of blocks that are allocated to files. Using this list, the tool reconstructs consistent segment files 170 in order to restore data blocks for file allocation. This utility can be run while the file system is on-line.

Alternative Embodiments

Several known alternative embodiments to the file system of the present invention exist that may improve the performance of the file system in one or more areas. Some improvements break the separation of meta-data and real-data. Benefits of these improvements may vary according to MFS server 108 performance, network performance 102, and workload.

Stuffed Inodes

SFS 124 is optimized for large file performance. Every file access requires SFS 124 to read the file inode 180 from MFS 132 and access real-data on the shared storage devices 110. For small files, this overhead time may be longer than the time needed to access a similar sized file directly from the MFS server 108. Furthermore, each SFS 124 file requires a minimum fixed storage overhead. For instance, a one byte file may require a minimum of four kilobytes of data on the MFS server 108 as well as four kilobytes on the shared storage devices 110. This internal fragmentation is significant for small files.

To reduce small file access times and internal fragmentation, SFS 124 could stuff inode files 180 with real-data. Stuffed inodes store real-data on the MFS server 108. Transparent to the users, SFS 124 would forward stuffed file requests to MFS 132 similar to directory and link files. SFS 124 would convert files that grow beyond the stuffing threshold into normal, shared-storage files. SFS 124 also would stuff non-stuffed files during file truncation. SFS 124 could determine whether an inode file 180 is stuffed with real-data by examining a flag in the header 182 or by examining the file size 190 of the inode file 180.

Segment Bitmaps on Network Attached Storage Devices

Segment files 170 contain segment header information as well allocation tables. During file allocation and de-allocation, SFS 124 modify the segment headers and allocation tables. For large file systems, segment files 170 may be hundreds of kilobytes. MFS 132 manages and transports segment files 170 to SFS 124. With high file system activity, the MFS server 108 may be overloaded.

To reduce server 108 workloads, SFS 124 could store segment headers information on MFS 132 and segment allocation tables on the network attached storage devices 110. With this optimization, the NAS devices 110 host meta-data as well as real-data. Segment meta-data could be distributed evenly across several devices 110.

Inode File Extents on Network Attached Storage Devices

Large, highly fragmented files may have relatively large inode files 180. To reduce server 108 load and distribute extent list accesses, SFS 124 could store inode file extents 184 on the NAS devices 110. SFS 124 would read inode file headers 182 from MFS 132. SFS 124 would then use extents in this header 182 to address shared storage device 110 data blocks that contain direct extents. These direct extents address real-data.

This optimization could have benefits for large files with many extents, since MFS 132 would maintain and transport less data; however, the additional indirection requires extra data transfers. Instead, a combination of both approaches could satisfy extreme cases. A flag within the inode file header 182 could indicate whether direct extents are stored on the MFS server 108 or on the NAS devices 110.

Meta-Data Consistency Manager

Meta-data consistency is extremely important. SFS 124 uses file locks managed by the MFS server 108 to preserve consistency. Although centralized servers can easily manage file locks and recovery, this centralized mechanism eventually becomes a bottleneck. SFS 124 may benefit from a distributed lock manager running on clients 106 or storage devices 110. Such a distributed lock manager could utilize techniques known in the prior art.

Store File Size in Inode Header

The SFS 124 implementation described above fills inode files 180 with holes to extend the inode size 190 to be larger than the file the inode 180 represents. This approach is based upon the assumption that SFS 124 can access MFS 132 file attributes quicker than reading file data. If this assumption ceases, storing the file size in the inode header 182 may improve file performance.

The invention is not to be taken as limited to all of the details thereof as modifications and variations thereof may be made without departing from the spirit or scope of the invention.

TABLE 1

| Meta-Data File | Contents |
| --- | --- |
| Superfile | File system block size |
| | Device name |
| | Device capacity |
| | Number of segments |
| Segment File | Segment header |
| |   Number of blocks in segment |
| |   Number of unallocated blocks in segment |
| |   Bitmaps table of with one bit assigned to each block in segment |
| Inode File | Inode header |
| |   Magic number to verify header integrity |
| |   Number of extents in inode file |
| |   Extent list where each extent contains |
| |     Flag: 0 - invalid extent, 1 - valid data, 2 - hole |
| |     Segment number of extent |
| |     Block offset into segment |
| |     Length in blocks of extent |
| |   Inode hole - size of hole based on file size |
| |   Last-byte |

What is claimed is:

1. A distributed file system residing on a plurality of computers, the distributed file system having a namespace defining a directory structure of files and metadata that includes pointers to real-data, the file system comprising:

a) at least one server computer running server software for managing the namespace;

b) a network; and c) at least one client computer located separately from the server computer and in communication with the server computer over the network, each running client software, the client software i) issuing namespace requests to the server computer over the network, each namespace request consisting of a filename and an operation encoded into a protocol interpretable by the server computer, the namespace requests selected from the group consisting of requests to add new filenames to the namespace, requests to remove existing filenames from the namespace, and requests to search the namespace for filenames, and ii) directly retrieving, analyzing, and altering the metadata.

2. The file system of claim 1, wherein metadata includes allocation tables that store information identifying data as allocated and not allocated.

3. The file system of claim 1, wherein the client software directly generates metadata pointers to real-data.

4. The file system of claim 1, wherein the server software enforces file access permissions.

5. The file system of claim 1, wherein the server software manages the namespace in response to namespace requests from the client computer, including requests to read a directory from the namespace.

6. The file system of claim 5, wherein the namespace search for filenames returns information necessary to retrieve the metadata.

7. The file system of claim 6, wherein the server software enforces file permissions during the namespace search.

8. The file system of claim 1, wherein the client computer directly responds to file system requests concerning a file from an application program.

9. The file system of claim 1, wherein the file system is a shared storage distributed file system in which the client computer directly accesses the shared storage device.

10. A network of connected computing devices for implementing a shared storage distributed file system, the file system having a namespace, real-data, and metadata, the network comprising:
   a) a network storage device connected to a the network;
   b) a server computer that manages the namespace by retrieving and modifying directory files in response to namespace requests, including requests to add new filenames to directory files and to remove existing filenames from directory files; and
   c) a client computer in network communication with the server computer and the network storage device, wherein the client computer
      i) issues namespace requests to the server computer over the network communication,
      ii) reads and writes the real-data directly from the network storage device, and
      iii) creates, retrieves, and modifies the metadata.

11. The network of claim 10, wherein the client computer communicates with the server computer via a local area network, and the client computer communicates with the network storage device via a storage area network.

12. The network of claim 11, wherein namespace requests are communicated via the local area network.

13. The network of claim 11, wherein the client reads and writes the real-data via the storage area network.

14. The network of claim 10, wherein the client computer requests file attributes from the server computer.

15. The network of claim 14, wherein file attributes axe communicated via the local area network.

16. The network of claim 10, wherein the client computer acquires a lock prior to modifying the metadata.

17. The network of claim 10, wherein the namespace requests include requests to search the namespace for filenames.

18. The network of claim 17, wherein the server computer enforces file access permissions during the namespace search.

19. The network of claim 10, wherein the client computer stores the metadata by requesting that the metadata be stored by the server computer.

20. The network of claim 19, wherein the server computer stores the metadata within a real-data file.

21. The network of claim 19, wherein the server computer is operating as the server of a client-server file system to store the metadata.

22. The network of claim 19, wherein the server computer stores the metadata on a server storage device locally attached to the server computer.

23. The network of claim 19, wherein the server computer stores the metadata on a server storage device different from the network storage device.

24. An improved file system operating as part of a client computer comprising:
   a) a digital communication path to a storage device;
   b) a network communication path to a server computer operating a server software program that maintains a namespace by receiving a namespace request from the client computer, reading the directory file corresponding to the request from the storage device, modifying the directory file, and writing the directory file to the storage device; and
   c) a client software program that runs on the client computer that responds to file system requests from an application program concerning a file, wherein the client software
      i) obtains addressing metadata containing at least one pointer addressing real-data for the file,
      ii) uses the addressing metadata to locate real-data associated with the file on the storage device,
      iii) alters the addressing metadata for the file; and
      iv) submits namespace requests across the network communication path to the server computer.

25. The improved file system of claim 24, wherein the server software adds new filenames to the namespace, removes existing filenames from the namespace, and searches the namespace for filenames.

26. The improved file system of claim 25, wherein the client software sends a namespace search request to the server software in order to obtain addressing metadata.

27. The improved file system of claim 26, wherein the server software enforces file access permissions during the namespace search.

28. The improved file system of claim 26, wherein the addressing metadata is found within an in ode obtained by the client software.

29. The improved file system of claim 24, wherein the client software further obtains allocation table metadata concerning allocation of storage on the storage device and modifies the allocation table metadata when performing file allocation and de-allocation.

30. The improved file system of claim 29, wherein the allocation table metadata is a bitmap table.

31. The improved file system of claim 24, wherein the addressing metadata is found within an mode obtained by the client software.

32. An improved file system operating on a client computer and a server computer to access a storage device containing real-data and one or more direct pointers addressing the real-data, the improved file system comprising:
   a) a server software program residing on the server computer, the server software program
      i) maintains a namespace defining a directory structure of files on the storage device,
      ii) services namespace requests from the client computer, and
      iii) stores an indirect pointer within the namespace related to a file, the indirect pointer addressing at least one file related direct pointer on the storage device; and
   b) a client software program residing on the client computer, the client computer being located separately from the server computer and issuing namespace requests to the server computer, the client software program responds to file system requests from an application program concerning the file; the client software program further
   i) obtains the indirect pointer for the file from the server software program,
   ii) uses the indirect pointer to obtain the file related direct pointer directly from the storage device, and
   iii) uses the file related direct pointer to read and write real-data associated with the file directly from the storage device.

33. The improved file system of claim 32, wherein the client software program modifies the file related direct pointer during file write operations.

34. The improved file system of claim 33, wherein the client software acquires a lock prior to modifying the file related direct pointer.

35. The improved file system of claim 32, wherein the namespace requests from the client computer include requests to add new filenames to the namespace, to remove existing filenames from the namespace, and to search the namespace for filenames.

36. The improved file system of claim 32, wherein the client software further obtains allocation table metadata concerning allocation of storage on the storage device and updates the allocation metadata when performing file allocation and de-allocation.

37. The improved file system of claim 36, wherein the client software acquires a lock prior to updating the allocation table metadata.

38. A client computer having an improved file system, the file system providing access to data stored on a storage device, comprising:
   a) a network connection to a server computer that is located separately from the client computer and that maintains a namespace defining a directory structure of files on the storage device, and
   b) client software residing and operating on the client computer that
      i) obtains allocation information concerning the allocation of storage on the storage device,
      ii) alters the allocation information for regular files during file allocation and de-allocation, and
      iii) submits namespace requests to the server computer over the network connection;
   wherein the alteration of the allocation information is performed in response to a request by an application program running on the client computer.

39. The improved file system on the client computer of claim 38, wherein the server software accesses and modifies the directory structure in response to namespace requests from the client computer, including requests to add new filenames to the namespace, to remove existing filenames from the namespace, and to search the namespace for filenames.

40. The improved file system on the client computer of claim 38, wherein the client software acquires a lock prior to obtaining the allocation information.

41. The improved file system on the client computer of claim 38, wherein the client software further:
   iii) obtains addressing metadata locating real-data for a particular file,
   iv) uses the addressing metadata to access real-data associated with the particular file on the storage device, and
   v) alters the addressing metadata for the file.

42. The improved file system on the client computer of claim 41, wherein the client software acquires a lock prior to altering the addressing metadata.

43. The improved file system on the client computer of claim 38, wherein the allocation information is obtained from the storage device and the altered allocation information is stored on the storage device.

44. A network of connected computer devices comprising:
   a) a first computer running software for
      i) managing a namespace of files, and
      ii) servicing namespace requests, the namespace requests including requests to add filenames to the namespace, remove filenames from the namespace, and search the namespace; and
   b) a second computer located separately from the first computer and running software for
      i) submitting to the first computer namespace requests relating to a file request and
      ii) analyzing and altering metadata relating to the file request, the metadata including pointers to real-data.

45. The network of claim 44, wherein the metadata includes data allocation information.

46. The network of claim 44, wherein the second computer directly responds to file requests from an application program.

47. The network of claim 44, wherein the first computer enforces file access permissions for requests received from the second computer.

48. The network of claim 47, wherein the first computer enforces file access permissions while adding a filename to a directory.

49. The network of claim 47, wherein the first computer enforces file access permissions while removing a filename from a directory.

50. The network of claim 47, wherein the first computer enforces file access permissions while searching for a filename within a directory.

51. A method for handling file requests by a file system comprising:
   a) receiving the file request at a client computer;
   b) requesting at the client computer that a server computer which manages a namespace for the file system perform a namespace search for the file of the request, the server computer being located separately from the client computer;
   c) analyzing and altering metadata relating to the location of real-data of the file request at the client computer; and
   d) saving on a storage device the metadata altered by the client computer.

52. The method of claim 51, wherein a lock is acquired prior to altering the metadata relating to the location of real-data.

53. A method for handling file requests by a file system comprising
   a) receiving the file request at a client computer;
   b) requesting at the client computer namespace data relating to the file request from a server computer, the server computer managing a namespace for the file system and the server computer also being located separately from the client computer;
   c) analyzing and altering metadata at the client computer, the metadata relating to the allocation information of storage on a storage device; and
   d) saving on the storage device the allocation information metadata altered by the client computer.

54. The method of claim 53, wherein the allocation information consists of bitmap tables.

55. The method of claim 53, wherein a lock is acquired prior to analyzing and altering allocation information metadata, and the lock is released after saving the allocation information.

56. A computer product, comprising:

a non-transitory computer readable medium having a computer program code embodied therein, said computer program code adapted to be executed to implement a method for handling file requests by a file system, the method comprising:

a) receiving the file request at a client computer;

b) requesting at the client computer that a server computer which manages a namespace for a file system perform a namespace search for the file of the request, the server computer being located separately from the client computer;

c) analyzing and altering metadata relating to the location of real-data of the file request at the client computer; and d) saving the metadata altered by the client computer.

\* \* \* \* \*